(12) United States Patent
Keeble et al.

(10) Patent No.: US 6,811,326 B2
(45) Date of Patent: Nov. 2, 2004

(54) FIBER OPTIC TRANSCEIVER MODULE

(75) Inventors: Daniel John Keeble, Felixstow (GB); Kim Leeson, Ipswich (GB); Stuart Wilkinson, Manningtree (GB)

(73) Assignee: Agilent Technologies, Inc., Palo Alto, CA (US)

( * ) Notice: Subject to any disclaimer, the term of this patent is extended or adjusted under 35 U.S.C. 154(b) by 126 days.

(21) Appl. No.: 10/052,603

(22) Filed: Jan. 18, 2002

(65) Prior Publication Data

US 2002/0131730 A1 Sep. 19, 2002

(30) Foreign Application Priority Data

Mar. 15, 2001 (GB) .............................................. 0106367

(51) Int. Cl.[7] .............................................. G02B 6/36
(52) U.S. Cl. ...................................................... 385/92
(58) Field of Search ............................ 385/88, 89, 92, 385/94, 14, 139; 398/135, 139

(56) References Cited

U.S. PATENT DOCUMENTS

| | | | | |
|---|---|---|---|---|
| 5,325,455 | A | * | 6/1994 | Henson et al. ................. 385/89 |
| 5,734,558 | A | * | 3/1998 | Poplawski et al. ........... 361/752 |
| 5,757,998 | A | | 5/1998 | Thatcher et al. .............. 385/75 |
| 5,767,999 | A | * | 6/1998 | Kayner ........................ 398/164 |
| 5,879,173 | A | * | 3/1999 | Poplawski et al. ............ 385/92 |
| 6,062,893 | A | | 5/2000 | Miskin et al. ............... 439/374 |
| 6,102,714 | A | | 8/2000 | Oliphant et al. ............ 439/131 |
| 6,183,308 | B1 | | 2/2001 | Laity .......................... 439/676 |
| 6,200,041 | B1 | | 3/2001 | Gaio et al. ..................... 385/92 |
| 6,215,666 | B1 | * | 4/2001 | Hileman et al. ............. 361/799 |
| 6,483,711 | B1 | * | 11/2002 | Huang .......................... 385/92 |
| 6,502,998 | B2 | * | 1/2003 | Yen et al. ..................... 385/88 |
| 6,607,308 | B2 | * | 8/2003 | Dair et al. ..................... 385/92 |

FOREIGN PATENT DOCUMENTS

| | | |
|---|---|---|
| EP | 0 110 632 A1 | 6/1984 |
| EP | 0 667 544 | 8/1995 |
| GB | 2 164 803 A | 3/1986 |
| GB | 2 258 093 A | 1/1993 |
| WO | WO 00/77551 | 12/2000 |

OTHER PUBLICATIONS

European Search Report Application No. EP 01 31 0415, Examiner I. Fader1., dated Jul. 10, 2002.

S.M. Colcombe, Examiner. United Kingdom Search Report, Application No. GB 0106367.6, dated Sep. 4, 2001.

* cited by examiner

Primary Examiner—Joseph Williams
Assistant Examiner—Peter Macchiarolo

(57) ABSTRACT

A fibre optic transceiver in which the optical components, interface, management functionality and management interface are all integrated on a single module, capable of being plugged into and removed from the telecommunication's parent system includes a housing having disposed therein a transmitter and a receiver. The housing further includes a pair of rails disposed on opposite sides of the housing to enable the module to be plugged into a suitably configured board. The module is designed primarily for use in 10Gbit serial optical systems, but is equally applicable for use in WDM applications, as well as at other speeds and wavelength.

16 Claims, 11 Drawing Sheets

FIBER OPTIC TRANSCEIVER MODULE

BACKGROUND OF THE INVENTION

1. Field of the Invention

The present invention concerns a novel fibre optic transceiver for use in a telecommunications system. Specifically, the present invention concerns a fibre optic transceiver in which the optical components, interface, management functionality and management interface are all integrated on a single module capable of being plugged into and removed from the telecommunication's parent system.

2. Background of the Invention

In order to meet demand for increased speed and capacity, optical telecommunications systems are being developed in which data is transmitted at a rate of 10 Gbit/s per second. The implementation of 10 Gbit systems has to overcome the fundamental problems of interfacing high frequency signals from an optical module to a customer's system. Connectors suitable for 10 Gbit operation are both costly and difficult to utilize.

FIG. 1 shows a known optical transceiver module which is connected to the telecommunications system (not shown) via a rail type arrangement. Here transceiver 100 is inserted into chassis 101 which must be first mounted onto base plate 102. This current arrangement is costly and suffers from poor electromagnetic (EMI) shielding.

Emerging standards for 10 Gbit systems require successful integration of 10 Gbit integrated circuits (IC's) with suitable multiplexer, demultiplexer and framing functionality. This alone is a considerable technical challenge facing implementation of 10 Gbit optical solutions. Furthermore, customers require that the transceiver modules are removable, known in the field as "hot pluggability". Once the addition of management functions via a management interface are included, the resulting implementation is large, costly and inefficient in terms of power usage.

Current systems utilize 10 Gbit serial or wavelength division multiplexing (WDM) transceiver modules which demultiplex the 10 Gbit signal into a number of lower speed signals. These low speed signals are then interfaced to system boards containing the higher functionality requirements. These systems typically require 8 to 16 low speed signals to reduce the interface problems to an acceptable level. In multiple implementations this results in the technical problem of routing a large number of signal traces both in the module and on the customer's board. In addition these systems tend to be customer specific and the achievable performance is dependent on the particular combination of integrated circuits (IC's) used.

Thus, it is an object of the present invention to overcome, or at least mitigate, the above mentioned technical problems.

SUMMARY OF THE INVENTION

According to the present invention there is provided an optical transceiver module comprising a housing having disposed therein a transmitter and a receiver, characterized in that the housing further comprises a pair of grooves disposed on opposite sides of said housing, the grooves having a plurality of spring-like fingers arranged to enable the module to be removably inserted into a suitably configured board.

According to a further aspect of the present invention there is provided an optical transceiver system comprising the module described above, wherein said system further comprises a chassis having said suitably configured board disposed therein, and chassis electrical connector means arranged to receive said module electrical connector means The present invention overcomes these problems by integrating all the requirements into a single module capable of being plugged into or removed from an operational parent system. The use of specifically designed components in a defined environment results in an easy to use, efficient solution to 10 Gbit implementations. The present invention covers all implementations of high-speed optical transceivers such as WDM, serial, single mode and multimode. The present invention is applicable to transceivers operating at speeds other than 10 Gbits. The resulting family of transceivers allows customers access to modules of defined performance and has the flexibility to upgrade or change system configurations by exchanging module types.

The industry standard XAUI interface uses four channels of data each typically running at 3.125 Gbit/s. By utilizing a PCB connector designed to operate at such speeds the module, according to the present invention, can be easily interfaced to system boards whilst significantly reducing the number of PCB traces and interconnections required.

BRIEF DESCRIPTION OF THE DRAWINGS

While the principle advantages and features of the invention have been described above, a greater understanding and appreciation of the invention may be obtained by referring to the drawings and detailed description of the preferred embodiments, presented by way of example only, in which.

DETAILED DESCRIPTION OF THE INVENTION

Figure 1:
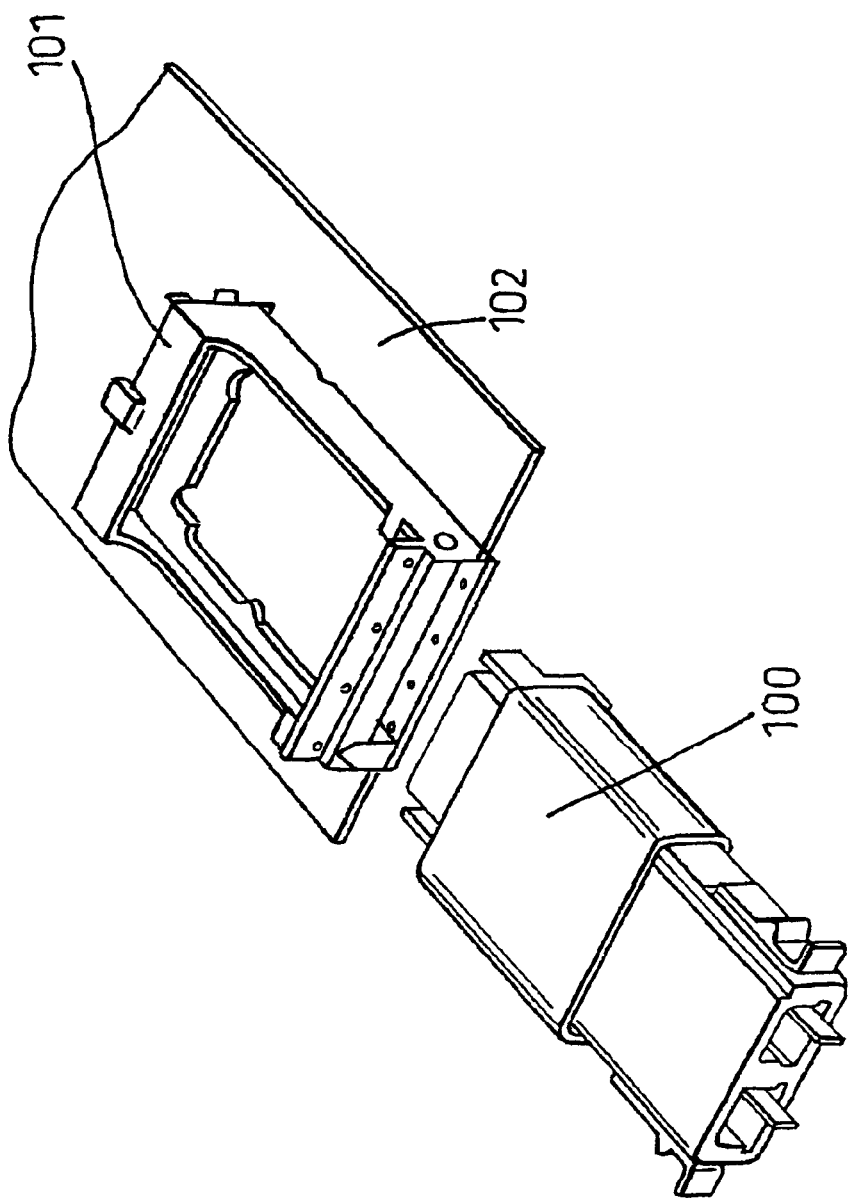
FIG. 1 shows a known optical transceiver module.
Figure 2:
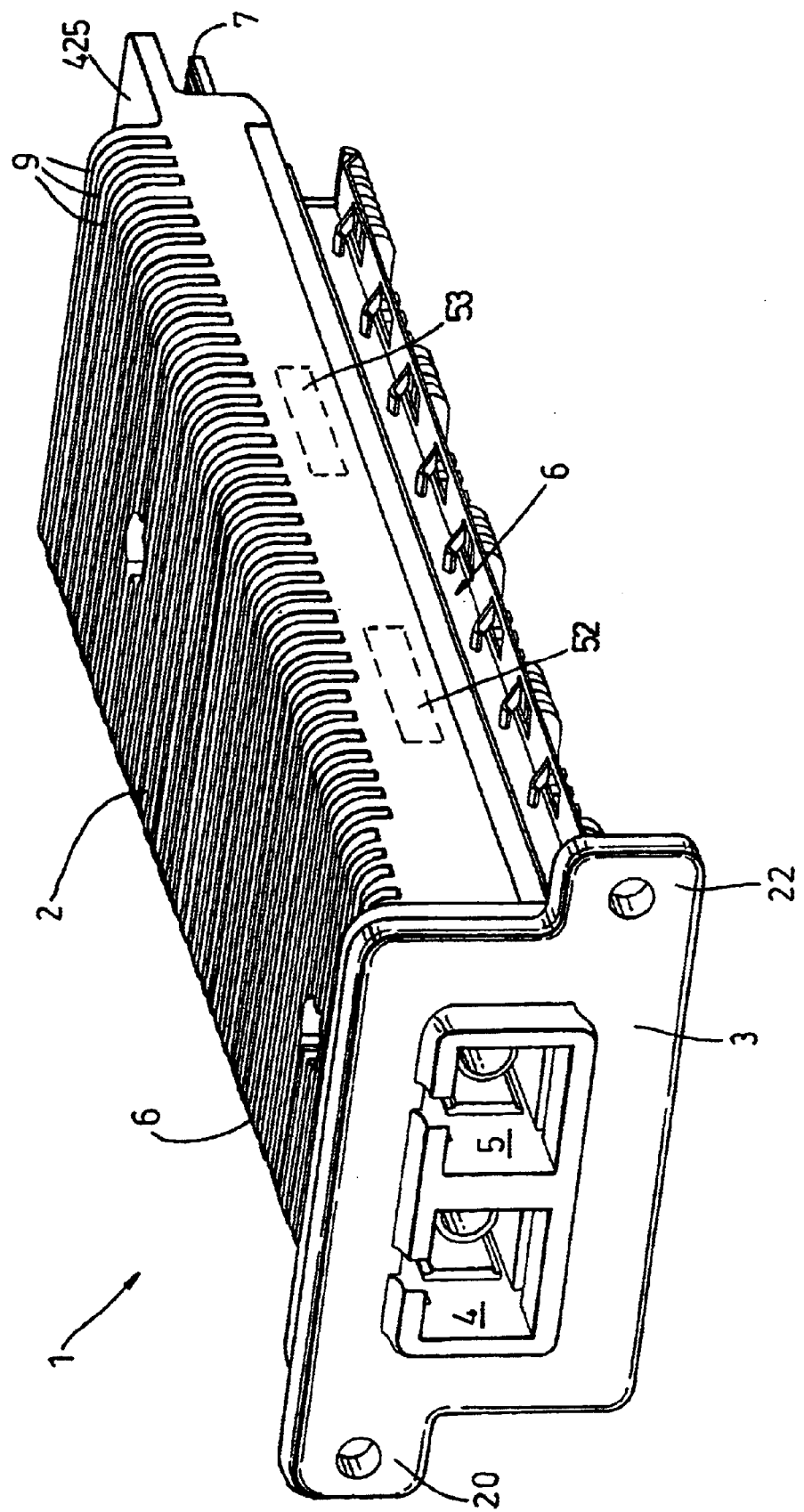
FIG. 2 shows an elevated view of the module.

In FIG. 2, the fibre optic transceiver module 1 according to the present invention is shown comprising housing 2, bezel 3, apertures 4 and 5, rail means 6, and module PCB connector means 7. The housing and bezel are preferably made of metal. However, other suitable material, such as a suitably loaded polymer could be used. The housing is configured with a series of fins 9, which are arranged in rows and act as heat sinks. The apertures provide access to the internal components of the module. Aperture 4 provides access to an optical signal receiver 52 and aperture 5 provides access to an optical signal transmitter 53. Alternatively, aperture 4 can provide access to the receiver and aperture 5 can provide access to the transmitter.

In the preferred embodiment shown in FIG. 2 the apertures 4, 5 are of the type suitable for receiving optical fibres fitted with SC type connectors. However, other connector types, such as LC, could be used without departing from the scope of the invention.

Groove means 6 are disposed on the sides of the housing in a manner so that the module can be inserted into a motherboard, with the rail means acting as a guide. The groove means may further act to support the module once inserted into the chassis. As will be apparent, a further groove means (not visible in FIG. 2) is disposed on the opposite side of the housing.

The PCB connector means 7 is disposed at the rear of the module. The PCB connector means function to establish electrical connection between the module and the parent system.

Figure 3:
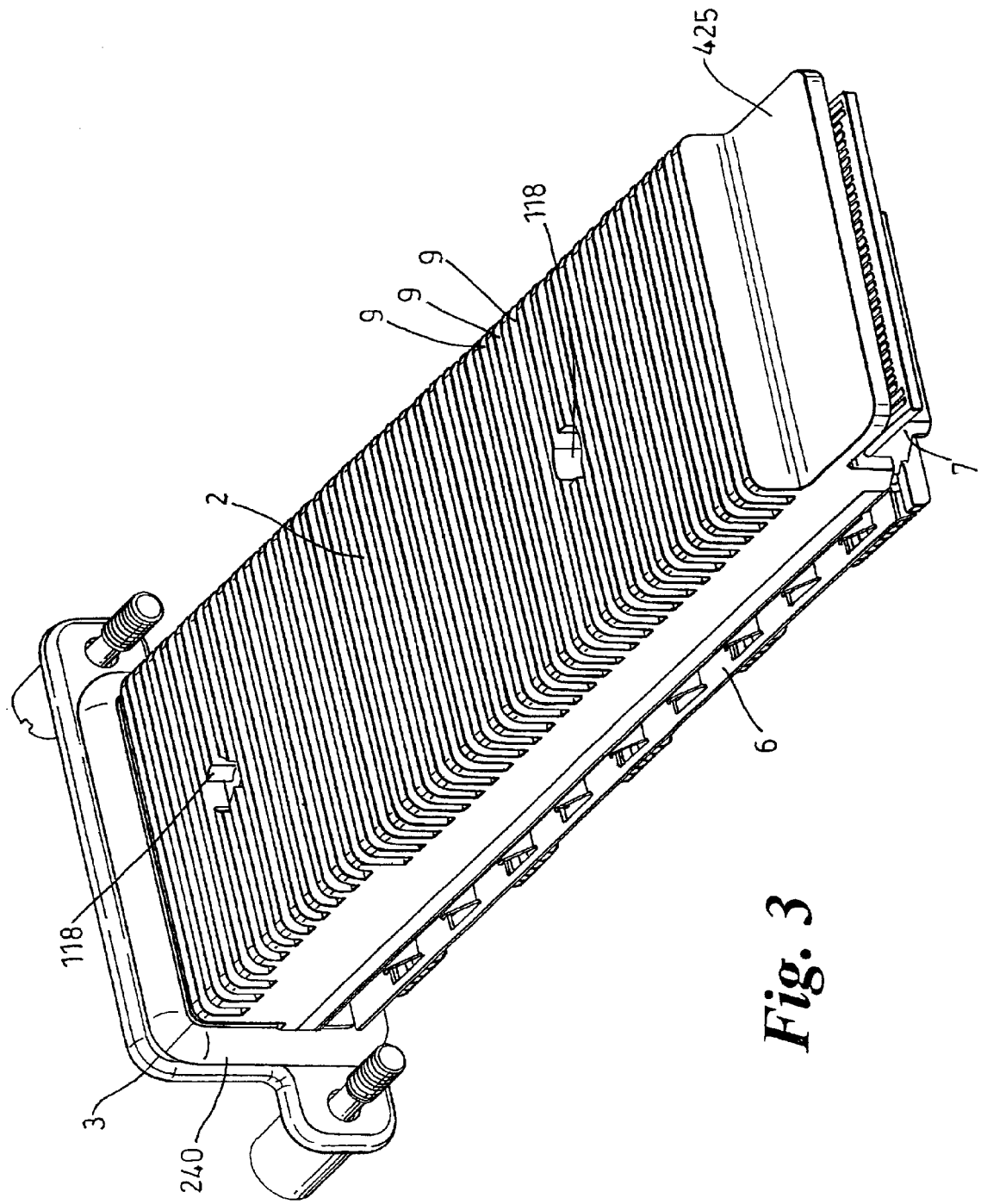
FIG. 3 shows an elevated view from the rear of the module.
Figure 4:
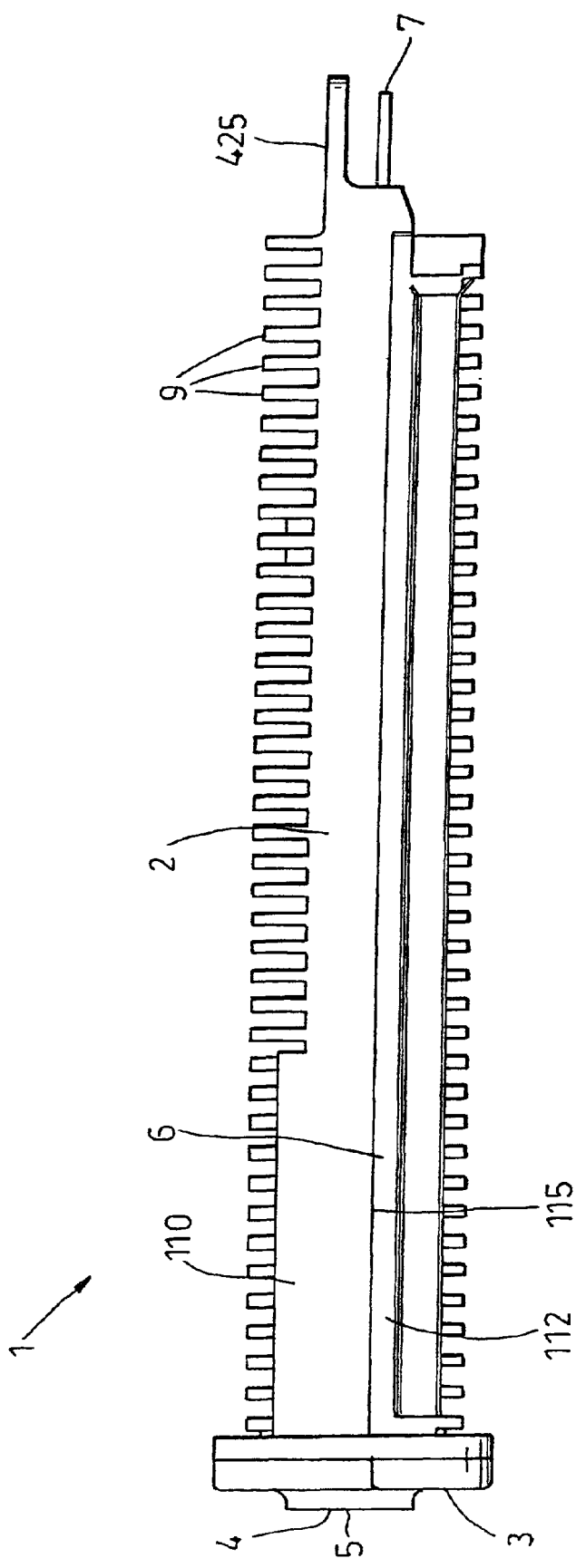
FIG. 4 shows a side view along the length of the module.

In FIGS. 3 and 4, where parts also appearing in FIG. 2 bear identical numerical designation, the PCB connector means can be seen more clearly, as can fins 9. The PCB connector means may further function to provide mechanical support for the module while inserted in the chassis.

As can be seen in FIG. 4, module 1 consists of an upper half 110 and a lower half 112. During assembly the upper and lower halves are sandwiched together and held together by suitable connection means such as screws 118 that are shown in FIG. 3. An electrically conductive gasket 115, known in the art as an EMI gasket, is disposed between the upper and lower halves. The EMI gasket functions to ensure good electrical connection between the two halves. In the embodiment shown here the module is approximately 4 inches long, 1.5 inches wide, and 1 inch tall. However, as will be appreciated, the module could have other dimensions without departing from the scope of the present invention.

It is known in the field of optical transceivers that good electrical ground connections are essential for optimum system performance. Establishing and maintaining good electrical ground connections is a key aspect of the present invention.

Figure 5:
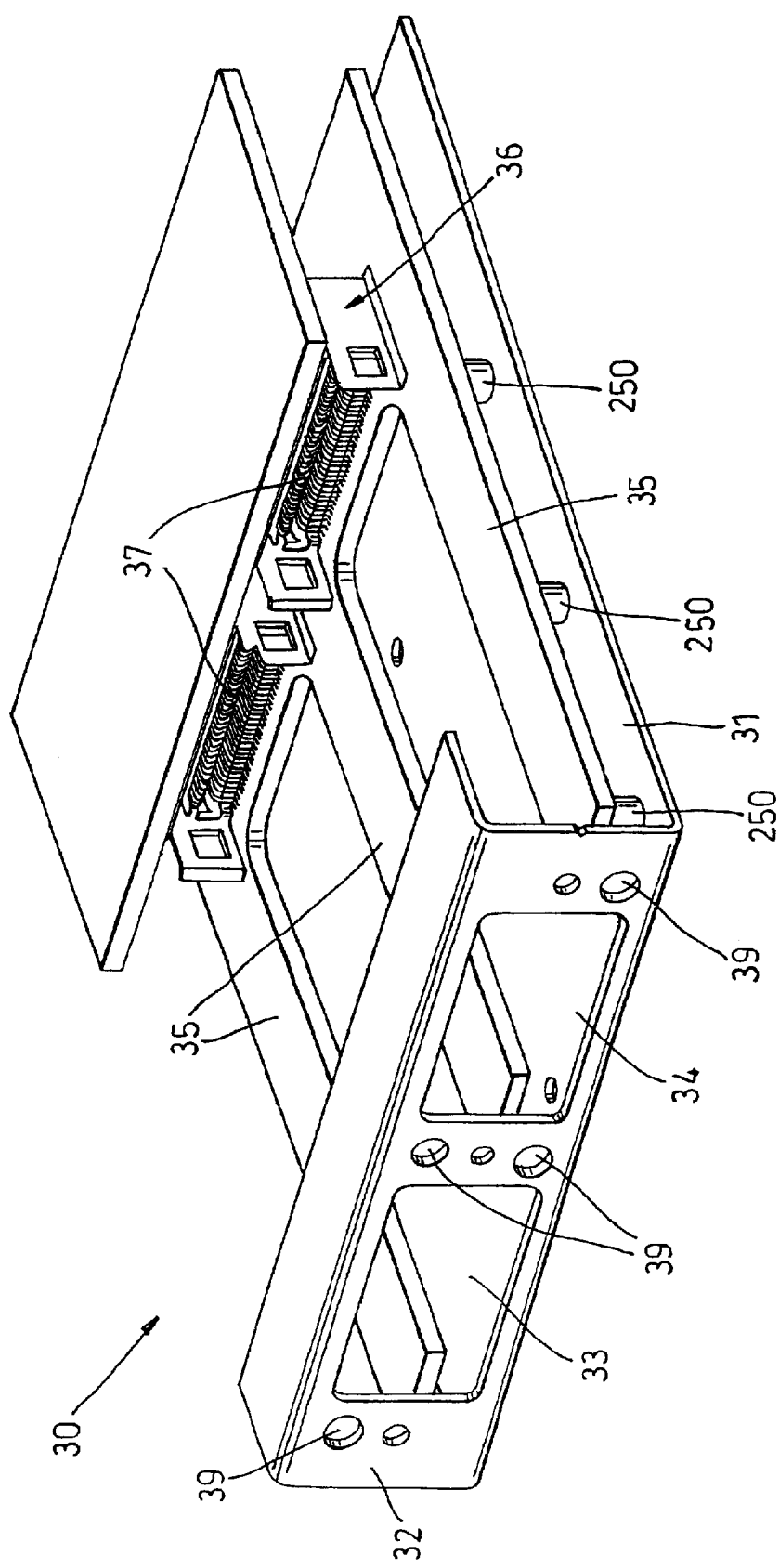
FIG. 5 shows an elevated view of a chassis suitable for receiving the module shown in FIGS. 1 to 4.

FIG. 5 shows chassis 30 comprising base plate 31 connected to front plate 32. The front plate includes openings 33, 34 which are suitable for receiving modules according to the present invention. The chassis further includes motherboard 35 connected to the base plate and arranged to receive rail means 6 during insertion of the module into the chassis. After insertion of the module the motherboard functions to provide support for the module. The motherboard shown in FIG. 5 is arranged to receive two modules. However, as will be appreciated, the motherboard can be arranged to receive any number of modules, depending on the system design.

At the rear of the chassis is disposed a system PCB connector 37 arranged to receive module PCB connector 7 thereby establishing electrical connection between the module and the parent system. The PCB connectors 7, 37 are preferably multiway edge connectors.

To the sides of system PCB connector 37 are disposed shield means 36. The shield means is made of metal and arranged so as to reduce the amount of electromagnetic radiation being emitted from the area of PCB connection.

The chassis base plate and front plate are preferably made of metal.

The front plate has a plurality of small apertures 39 disposed therein. These small apertures are arranged around the openings 33, 34 and function to allow the module to be secured in place in the chassis.

The chassis shown in FIG. 5 has two openings 33, 34 and is suitable for the insertion of two modules. However, as per the motherboard, the chassis may be configured to receive any number of modules, depending on the requirements of the parent system. For example, in FIG. 6, where parts also appearing in FIGS. 2–5 bear identical numerical designation, chassis 30 is shown with a single module inserted into opening 34 of the chassis. In this example opening 33 has no module inserted and is covered by dummy plate 40. Alternatively, a dummy module could be used to preserve air flow characteristics. Both module 1 and dummy plate 40 are secured in place by captive fasteners 41.

Figure 6:
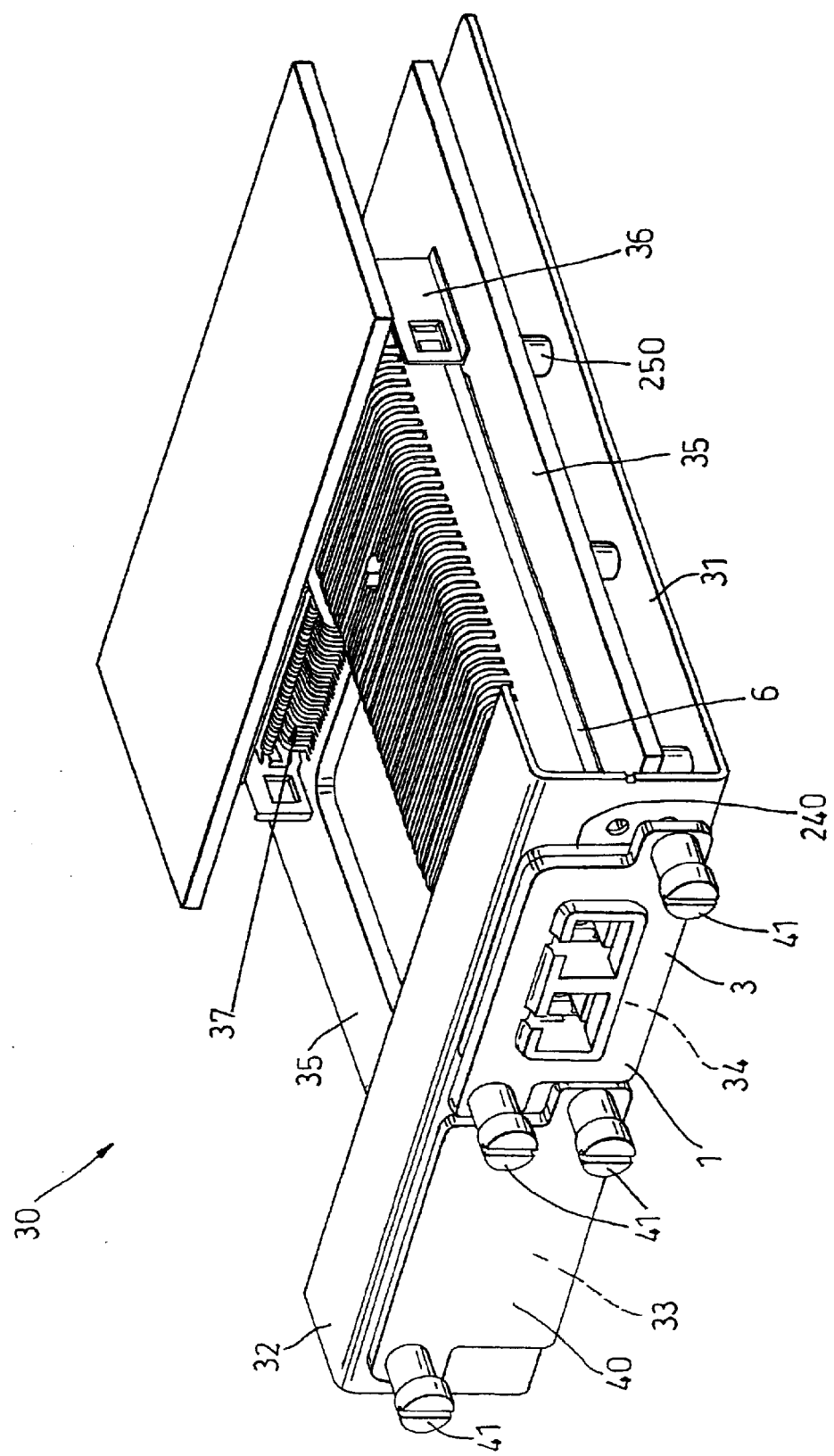
FIG. 6 shows an elevated view of the chassis with the module inserted.

In a further aspect of the invention which is best demonstrated in FIGS. 2 and 6, bezel 3 of module 1 is arranged with an upper arm 20 and lower arm 22, each extending from diagonally opposite corners of the bezel. By arranging the bezel in this manner a plurality of modules can be inserted into the chassis at a closer spacing, thus reducing the overall size of the chassis needed for a given number of modules. Furthermore, by arranging the bezel as shown in FIGS. 2 and 6, improved access to the captive fasteners 41 is gained, thus furthermore improving the ease in which modules can be inserted and removed from the system.

As best seen in FIGS. 3 and 6, a further EMI gasket 240 is disposed behind the bezel. This further EMI gasket functions to establish good electrical connection between bezel 3 and front panel 32 when the module is secured in place, thus helping to improve the overall electrical grounding of the system.

Figure 7:
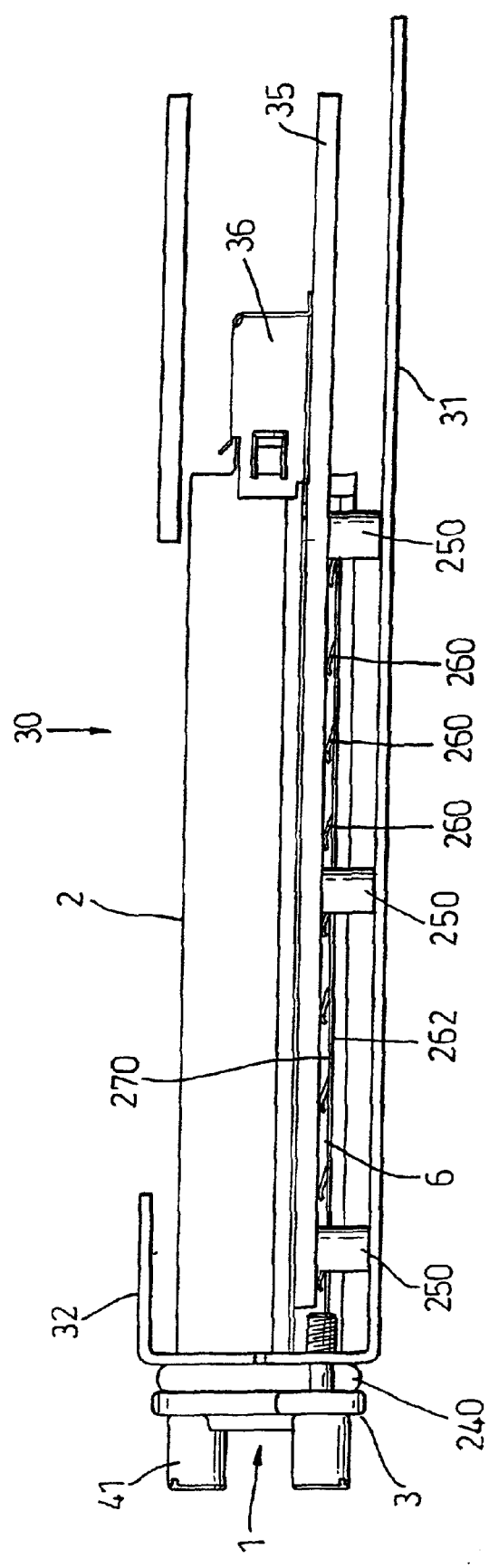
FIG. 7 shows a further side view along the length of the module.
Figure 8:
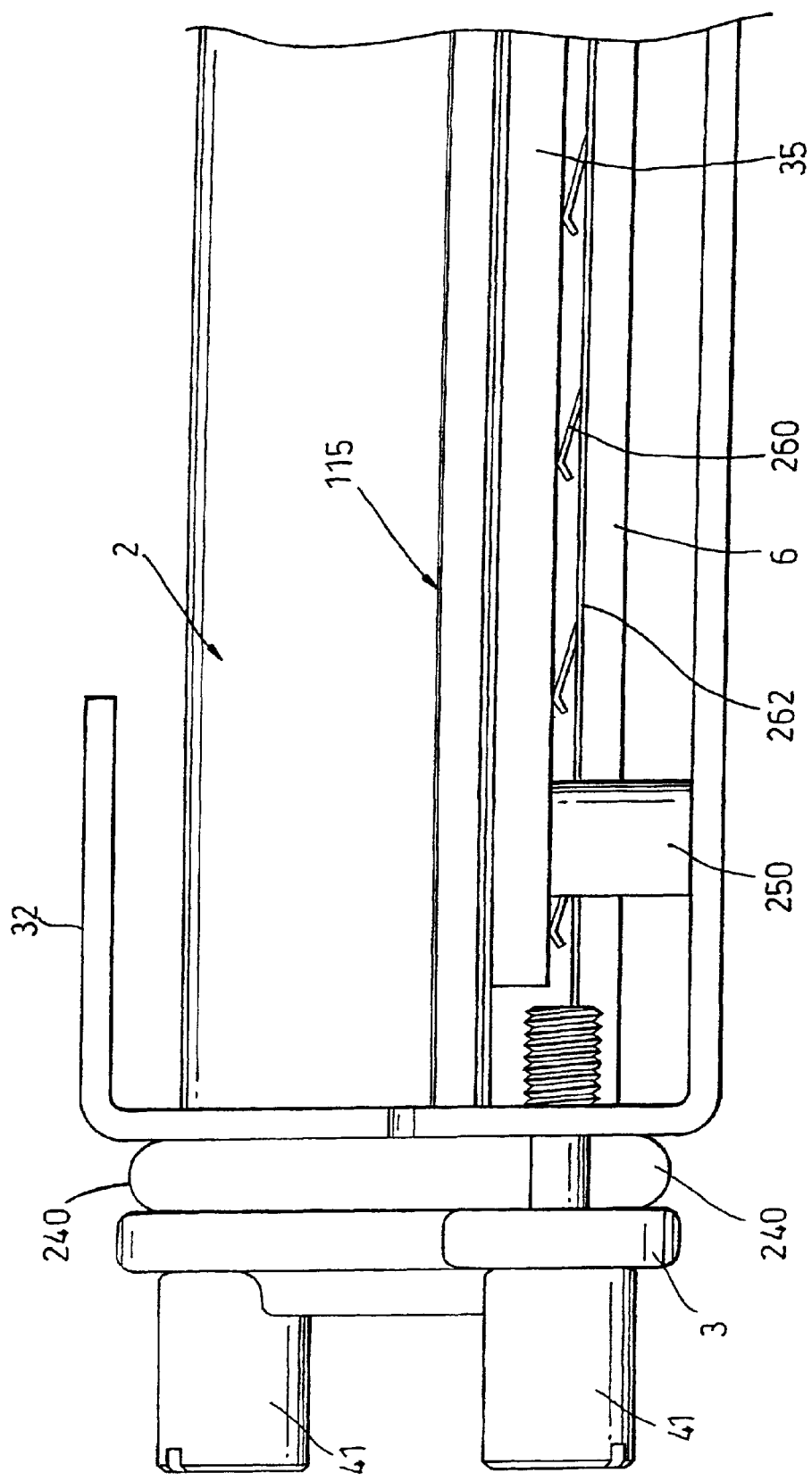
FIG. 8 shows a more detailed view of the module.
Figure 9:
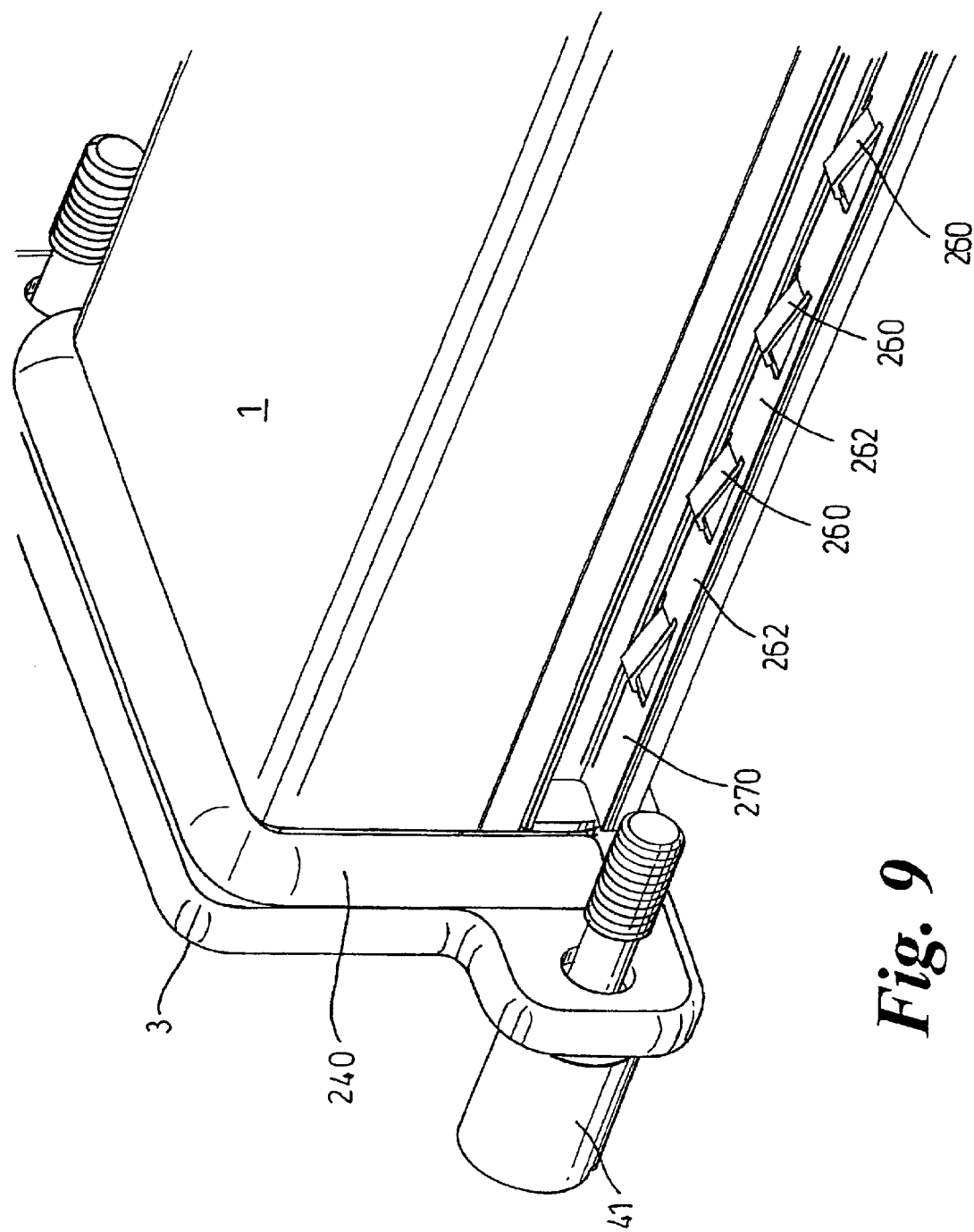
FIG. 9 shows a more detailed elevated view of the module.

As previously mentioned, and now shown in more detail in FIGS. 7, 8 and 9, where parts also appearing in FIGS. 2–6 bear identical numerical designation, groove means 6 comprises a plurality of spring like fingers 260 flexibly attached to an interposer 262. The spring fingers and interposer are preferably made of metal and form a single piece part. As will be appreciated, a substantially identical groove means is disposed on the opposite side of the module.

The groove means are inserted into motherboard 35 via a rail 270 formed in the motherboard. The spring fingers are arranged so as to accept a range of motherboard thickness, while still securely holding the module in place. For example, the spring fingers are arranged to accept motherboards with thickness ranging from 2 mm to 3.1 mm.

As a further feature of the present invention, the motherboard is supported by a plurality of mounting pillar 250. By arranging the motherboard as such, air is able to flow both above and below the module, advantageously improving cooling of the module.

Figure 10:
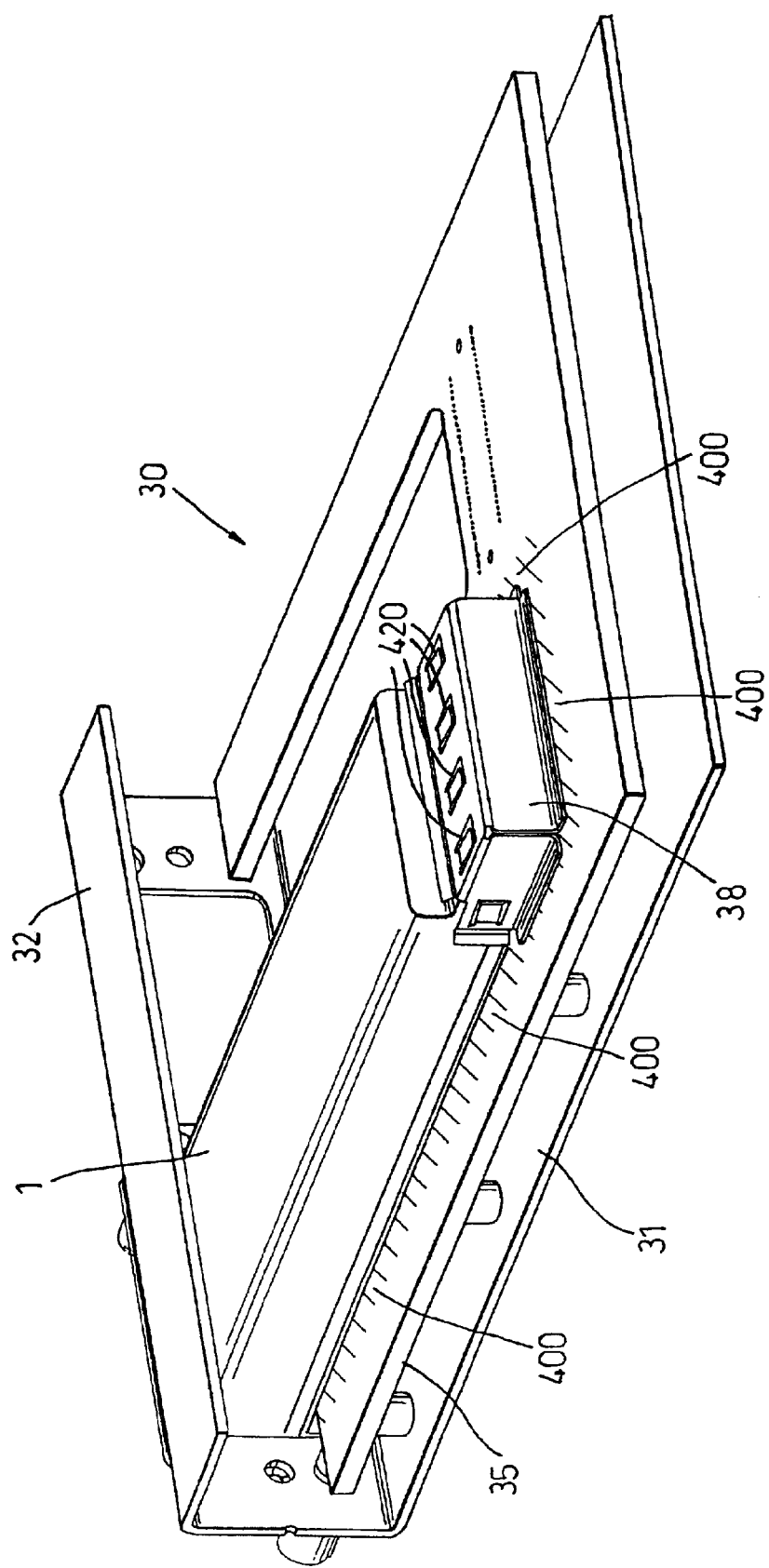
FIG. 10 shows an elevated rear view of the chassis with the module inserted.
Figure 11:
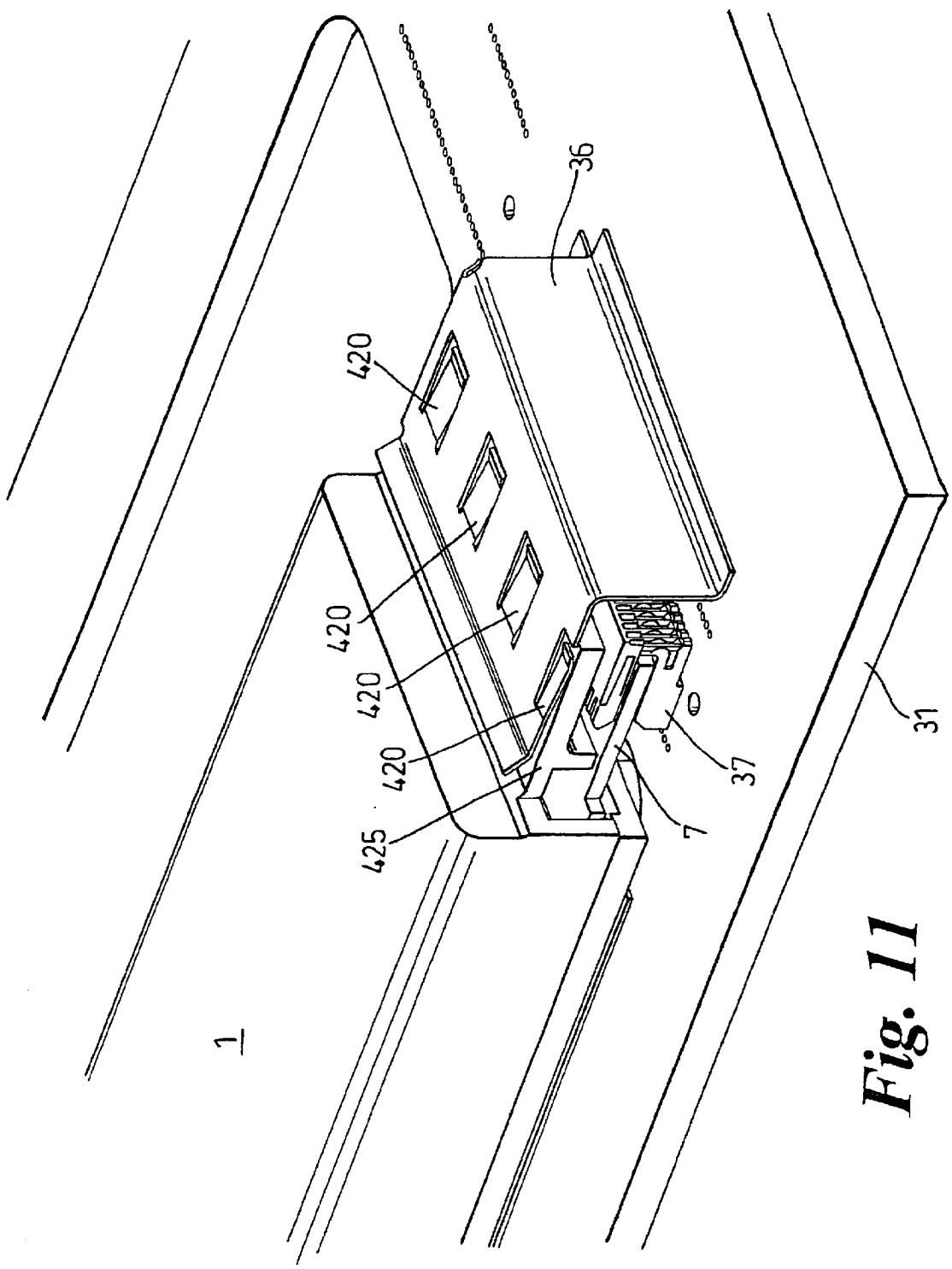
FIG. 11 shows a detailed view of the rear of the chassis with the module inserted.

As shown in FIGS. 10 and 11, module PCB connector means 7 is plugged into system PCB connector 37. Shield means 36 is disposed over connectors 7 and 37 in order to contain electromagnetic emission and to help further improve the electrical ground of the system. The shield means may include a plurality of resilient fingers 420 which exert pressure on a rear extending portion of the housing 425 when the module is fully inserted into the chassis. These resilient fingers function to ensure good electrical connection between the shield means and the module.

In FIG. 11 a portion of shield 36 has been removed to better show connectors 7 and 37. As will be appreciated with multi way type connectors, the height of connector 7 must be precisely aligned to connector 37 in order for connection to be made. The rail means in general, and specifically the spring fingers, function to ensure that module connector 7 is at the correct height for connection to be made to system connector 37.

In a further embodiment of the present invention, and as seen in FIG. 10, a thin layer of gold 400 or other suitable metal is disposed on the motherboard around where module 1 is inserted. The presence of the gold layer, which is shown by the dashed line pattern 400, is to establish electrical connection between the rail means and the front plate and base plate of the chassis. Preferably, shield means 36 is soldered to the gold layer. Thus an area of electrical connection is established surrounding the module, which can then easily be connected to a customer's own ground connection.

Advantageously, a module according to the present invention, can be easily is inserted and removed from the chassis. Furthermore, additional modules or replacement modules can be easily inserted, thus providing a totally pluggable system.

The module and chassis described above are preferably configured to operate in a 10 Gbit serial optical Ethernet system. To this effect the module is configured as an optical transceiver operating at a wavelength of 1300 nm with sufficient power to operate over a 10 kilometer single mode optical fibre link. However, the module concept is equally applicable for use at other speeds and at different wavelengths, as well as over different distances and with different types of fibres.

In a further embodiment of the present invention, the module includes all the functional controls needed for a 10 Gbit transceiver. The functional controls preferably include an XAUI interface, management functionality, and a management interface. The management interface is preferably an MDIO interface. The XAUI interface and management functions are preferably implemented on an ASIC disposed within the module, enabling direct connection to a 10 Gb Media Independent Interface.

Preferably the module further includes two subassemblies: a transmitter optical subassembly with a directly modulated laser and a receiver subassembly with a photodiode and transimpedance amplifier. The laser drive, MUX receiver post-amplification and DEMUX functions are achieved using custom ASICs.

Advantageously, the module is able to convert full duplex XAUI electrical signals into full-duplex-optical signals. Management of the transceiver and optical links is managed via the MDIO. The XAUI interface operates at 3.125 Gbaud, and the electrical connection is via a hot pluggable connector.

What is claimed is:

1. An optical transceiver module comprising:
    a housing having disposed therein a transmitter and/or a receiver, wherein said housing further comprises a pair of grooves disposed on opposite sides of said housing, said grooves having a plurality of spring-like fingers arranged to enable said module to be removably inserted into a suitably configured board.

2. A module as claimed in claim 1, wherein electrical connection means are disposed at a back end of said module.

3. A module as claimed in claim 1, wherein said housing includes a plurality of fins disposed thereon and arranged to facilitate temperature control of said module.

4. A module as claimed in claim 1, wherein said module includes a bezel disposed at a front end of said module, said bezel having a pair of arms each extending from diagonally opposite corners of said bezel.

5. A module as claimed in claim 1, wherein said housing comprises an upper half and a lower half sandwiched together, and an electrically conductive gasket disposed there between to facilitate electrical connection between said upper and lower halves.

6. An optical transceiver as claimed in claim 1, wherein said suitably configured board includes a structure that mates with said grooves, and wherein said spring-like fingers exert a force against said structure that is perpendicular to a longitudinal axis of said grooves.

7. An optical transceiver system comprising:
    an optical transceiver module including a housing having disposed therein a transmitter and/or a receiver, wherein said housing further includes a pair of grooves disposed on opposite sides of said housing, said grooves having a plurality of spring-like fingers arranged to enable said module to be removably inserted into a suitably configured board that is disposed in a chassis, and chassis electrical connector means arranged to receive a module electrical connector means.

8. A system as claimed in claim 7, wherein said suitably configured board is disposed within said chassis on a plurality of mounting means so as to enable air to pass both above and below said module.

9. A system as claimed in claim 8, wherein said module, said chassis and said suitably configured board are electrically grounded.

10. A system as claimed in claim 7, wherein said system further comprises shield means disposed substantially around said module and said chassis electrical connectors means so as to provide electrical connection from said module to said suitably configured board.

11. A system as claimed in claim 10, wherein said shield means includes a plurality of resilient fingers arranged to exert pressure on said housing so as to improve electrical connection between said housing and said shield means.

12. A system as claimed in claim 7, wherein a layer of electrically conductive material is disposed on said suitably configured board in an area substantially surrounding said module, so as to further improve electrical connection between said module and said chassis.

13. A system as claimed in claim 12, wherein said layer of electrically conductive material is comprised of gold.

14. An optical transceiver system as claimed in claim 7, wherein said suitably configured board includes a structure that mates with said grooves, and wherein said spring-like fingers exert a force against said structure that is perpendicular to a longitudinal axis of said grooves.

15. An optical telecommunications network comprising:
    an optical transceiver system comprising:
        an optical transceiver module including a housing having disposed therein a transmitter and/or a receiver, wherein said housing further includes a pair of grooves disposed on opposite sides of said housing, said grooves having a plurality of spring-like fingers arranged to enable said module to be removably inserted into a suitably configured board that is disposed in a chassis, and chassis electrical connector means arranged to receive a module electrical connector means.

16. A network as claimed in claim 15, wherein said suitably configured board includes a structure that mates with said grooves, and wherein said spring-like fingers exert a force against said structure that is perpendicular to a longitudinal axis of said grooves.

* * * * *